United States Patent
Herber et al.

(10) Patent No.: US 11,522,774 B2
(45) Date of Patent: Dec. 6, 2022

(54) NETWORK SWITCH

(71) Applicant: NXP B.V., Eindhoven (NL)

(72) Inventors: Christian Herber, Hamburg (DE); Donald Robert Pannell, Cupertino, CA (US); Manfred Kunz, Rastatt (DE)

(73) Assignee: NXP B.V., Eindhoven (NL)

( * ) Notice: Subject to any disclaimer, the term of this patent is extended or adjusted under 35 U.S.C. 154(b) by 58 days.

(21) Appl. No.: 17/301,720

(22) Filed: Apr. 12, 2021

(65) Prior Publication Data

US 2022/0329503 A1 Oct. 13, 2022

(51) Int. Cl.
| | |
|---|---|
| *H04L 43/028* | (2022.01) |
| *H04L 49/25* | (2022.01) |
| *H04L 9/40* | (2022.01) |
| *H04L 49/00* | (2022.01) |
| *H04L 69/22* | (2022.01) |
| *H04L 47/32* | (2022.01) |

(52) U.S. Cl.
CPC ............ *H04L 43/028* (2013.01); *H04L 47/32* (2013.01); *H04L 49/25* (2013.01); *H04L 49/3018* (2013.01); *H04L 63/0236* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 5,606,668 | A | 2/1997 | Shwed |
| 7,292,531 | B1 * | 11/2007 | Hill ................ H04L 43/0882 370/230.1 |
| 8,599,845 | B2 | 12/2013 | Loon et al. |
| 8,789,135 | B1 | 7/2014 | Pani |

(Continued)

FOREIGN PATENT DOCUMENTS

| | | |
|---|---|---|
| EP | 1 262 043 B1 | 3/2008 |
| EP | 3297228 A1 | 3/2018 |
| WO | WO-2016195619 A1 * 12/2016 | ............ H04L 43/16 |

OTHER PUBLICATIONS

"802.1D IEEE Standard for Local and metropolitian area networks—Media Access Control (MAC) Bridges", IEEE Standards, 281 pgs. (Jun. 9, 2004).

(Continued)

*Primary Examiner* — Anh Vu H Ly

(57) ABSTRACT

A network switch is disclosed. The network switch includes an input port and an output port. The network switch further includes a rule logic and a memory for storing a configurable counter. The rule logic is configured to inspect a packet received via the input port and attempt to find a rule for the packet and if the rule is found, to reset the counter and process the packet according to a preconfigured follow up action associated with the rule and if the rule is not found, to route the packet according to a default rule. The rule logic is configured to identify the packet for a follow up action based at least on a subset of content of the packet including a header and a payload of the packet. The counter may hold a time value or the number of packets from a same source (Continued)

to a same destination, a number of bytes received from the same source to a same destination, or a user configurable parameter to control the rule validity period.

16 Claims, 2 Drawing Sheets

(56) References Cited

U.S. PATENT DOCUMENTS

| | | | |
|---|---|---|---|
| 2008/0077705 A1* | 3/2008 | Li ........................ | H04L 47/2441 709/236 |
| 2010/0103837 A1* | 4/2010 | Jungck ................ | H04L 63/0227 370/252 |
| 2014/0098669 A1 | 4/2014 | Sarg et al. | |
| 2015/0067815 A1* | 3/2015 | Overcash ............ | H04L 63/0263 726/11 |
| 2019/0007327 A1* | 1/2019 | Baldi ....................... | H04L 45/64 |
| 2020/0274787 A1* | 8/2020 | Dasgupta ................ | H04L 67/10 |
| 2020/0374333 A1* | 11/2020 | Racz ........................ | H04L 69/22 |
| 2021/0067448 A1* | 3/2021 | Remen .............. | H04L 45/74591 |

OTHER PUBLICATIONS

"IEEE Standard for Local and Metropolitan Area Networks-Bridges and Bridged Networks", IEEE Computer Society, 1993 pgs. (2018) uploaded in 20 parts.

\* cited by examiner

NETWORK SWITCH

BACKGROUND

A network switch is a device that typically operates at the Data Link layer of the OSI model-Layer 2. The network switch takes in packets being sent by devices that are connected to its physical ports and sends the packets out again, through the ports that lead to the devices the packets are intended to reach. Some network switches also operate at the network layer-Layer 3 where routing occurs. Network switches are a common component of networks based on Ethernet, Fiber Channel, Asynchronous Transfer Mode (ATM), and InfiniBand, among others. In general, though, most network switches today use Ethernet. Once a device is connected to a network switch, the network switch notes the media access control (MAC) address of the device. The network switch uses the MAC address to identify which attached device outgoing packets are being sent from and where to deliver incoming packets. When a device sends a packet to another device, the packet enters the network switch and the network switch reads its header to determine what to do with the packet. The network switch matches the destination address along with other fields in some cases and sends the packet out through the appropriate ports that leads to the destination devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a network switch is disclosed. The network switch includes an input port and an output port. The network switch also includes a rule logic and a memory for storing a counter. The rule logic is configured to inspect a packet received via the input port and attempt to find a rule for the packet and if the rule is found, to reset the counter and process the packet according to the rule and if the rule is not found, to process the packet according to a default rule. The rule logic is configured to identify the packet for a follow up action based at least on a subset of content of the packet, including header and payload of the packet. In some examples, if no matching rule is found the packet may be sent to an external system for further processing. In another example, a default rule may be used if no matching rule for the received packet is found and the default rule may include sending the received packet to an external system such as but not limited to a firewall. The counter may hold a time value or the number of packets from a same source to a same destination or a number of bytes received from the same source to a same destination or a user configurable parameter to control the rule validity period.

In some examples, the rule logic is implemented using content addressable memory that is configured to perform a memory look up based on contents of the packet. The inspection may include verifying that the counter has not reached a predefined rule expiry time. The default rule may include forwarding the packet to an external firewall. In another example, the default rule includes dropping the packet or closing the connection from the source of the packet.

In some examples, the default rule includes setting up a rule for processing future packets from a same source as a source of the packet when the packet is accepted by the external system such as a firewall. The rule may include a flag to indicate active or de-active status of the rule.

In some examples, the attempt to find includes checking if the flag is set to the active status. The rule logic is configured to use a system timer to alter the counter in configurable intervals. The rule logic may also be configured to set the flag to indicate the de-active status when the countdown reaches a preconfigured value.

In another embodiment, a method for processing a packet by a network switch is disclosed. The method includes inspecting the packet and attempt to find a rule for the packet and if the rule is found, to reset a counter associated with the rule and route the packet according to the rule and if the rule is not found, routing the packet according to a default rule.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
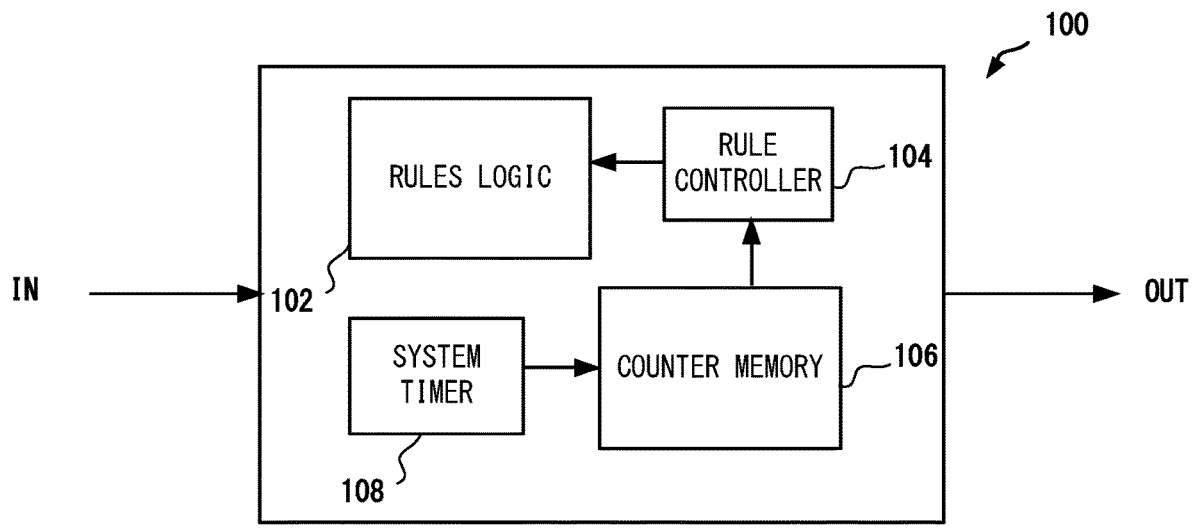
FIG. 1 depicts a network switch in accordance with one or more embodiments of the present disclosure.

Note that figures are not drawn to scale. Not all components of the improved ground switch are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Advanced switches contain deep packet inspection (DPI) lookups. Deep packet inspection (DPI) or packet sniffing is a type of data processing that inspects in detail the data being sent over a computer network, and may take actions such as alerting, blocking, re-routing, or logging it accordingly. Deep packet inspection is often used to baseline application behavior, analyze network usage, troubleshoot network performance, ensure that data is in the correct format, to check for malicious code, eavesdropping, and internet censorship, among other purposes.

The DPI allows application of typical switch follow up actions based on information included in the packet, including layer 3 and layer 4 information. Such a lookup is typically implemented using ternary content-addressable memory (TCAM). TCAM is a specialized type of high-speed memory that searches its entire contents in a single access. The term "ternary" refers to the memory's ability to store and query data using three different inputs: 0, 1 and X. The "X" input, which is often referred to as a "don't care" or "wildcard" state, enables TCAM to perform broader searches based on pattern matching, as opposed to binary CAM, which performs exact-match searches using only 0s and 1s.

The DPI mechanism can be used for filtering traffic according to security policies to create a simple firewall. Such a firewall will evaluate each packet individually, irrespective of the history of packets (i.e., it is stateless). Security of firewalls can be improved by adding statefulness to the lookups. Stateful firewalls operate by storing the state of specific connections or traffic flows and using this in the decision making process. For protocols that do not have a built-in handshake mechanism (e.g., user datagram protocol or UDP, internet control message protocol or ICMP), stateful firewalls monitor the activity of the flow and closing the connection after a timeout. However, adding the statefulness requires the involvement of an external processor. Embodiments described herein uses an aging mechanism to the DPI rules to allow a network switch to monitor such traffic without the involvement of an external processor. A rule may be deactivated after no traffic has been seen within a preconfigured time window.

The embodiments described herein uses countdown/count up counters associated with the rules. If packets for which a particular rule needs to be applied continue to arrive within the preconfigured time windows, the counter for the rule is continued to be reset after each of the packets so that the rule remains active. However, if no packet for which the particular rule needs to be applied, is received prior to the preconfigured time window lapses, one or more preconfigured timeout follow up actions may be performed. The timeout follow up actions may include deactivation of the rule, modification of the rule, modification of another rule and/or raising an interrupt request. User specific follow up actions may also be incorporated in the network switch. The network switch described herein is advantageous because the network switch reduces workload of an external trusted system such as an external firewall system. The operations of the network switch described here apply to stream identification rules, where such a rule identifies packets for follow actions based on at least a part of protocol header and/or payload fields, covering protocols starting at layer 2 and/or higher layers. In some examples, a matching for a received packet may be found by searching for a rule by a predefined data pattern in the received packet. In some examples, a received packet may include at least one other packet embodied in the received packet. In such examples, the predefined data pattern may include data from the received packet and the other packet embodied in the received packet. In some examples, if no matching rule is found the packet may be sent to an external system for further processing. In another example, a default rule may be used if no matching rule for the received packet is found and the default rule may include sending the received packet to an external system such as but not limited to a firewall.

The countdown timer is used for example only. The counter may hold a time value or a timer counter or the number of packets from a same source to a same destination, a number of bytes received from the same source to a same destination, or a user configurable parameter to control the rule validity period.

FIG. 1 shows a network switch 100. The network switch 100 includes an input port, an output port, a rule logic 102 and a rule controller 104. In some examples, the rule controller 104 may be a part of the rule logic 102. The rule logic 102 may be implemented in hardware or software, preferably in hardware. In some examples, a content addressable memory (CAM) may be used to provide a lookup of rules. The rule logic 102 may include a content addressable memory to keep a plurality of rules. CAM is a special type of memory used to provide high-speed searching applications. CAM compares input search data against a table of stored data, and returns the address of matching data. A rule may be configurable to be triggered by a user selected part of a data packet. For example, a rule may be triggered when a packet includes a particular source IP, source port, destination IP and destination port. For example, if a rule table stored in the CAM of the rule logic 102 is searched for source IP, source port, destination IP and destination port, the CAM will return the memory address containing a configurable follow up operation. For example, the follow up operation may be to allow the packet to be transmitted to the destination or dropping the packet, or sending the packet to an external firewall. The network switch 100 may also include a memory 106, for example, a read access memory (RAM), to store a countdown counter. In some examples, each rule stored in the CAM may have a dedicated countdown counter. A system timer 108 is included to reset or decrement the countdown counter at configurable intervals. The term countdown is used for example only. The countdown may be implemented to provide a time out period using count up or count down.

In one example, a default rule may be used when no matching rule is found for a packet based on the contents of the packet. The default rule may include a follow up action such as drop the packet, close the connection, forward the packet to an external trusted system such as a firewall or a router. In some embodiments, if the firewall, for example, accepts the packet, the rule controller 104 may create a new rule and store the rule in the CAM. For example, if a UDP packet includes the source address 192.168.0.2:1002 and the destination address 192.168.0.1:1001 and based on the source address and the destination address, if a rule is found in the rule logic 102, the network switch 100 will forward the packet to the destination address if the associated follow up operation directs such forwarding. If no rule is found, a default rule may be activated and a follow up operation associated with the default rule may direct the packet to an external firewall. If the firewall accepts the packet, the rule logic 102 will be reconfigured to add a new rule (or if an existing rule for the packet exists in a de-active state, activate the existing rule) for the future packets of same type.

In some examples, the rule may include a flag to indicate if the rule is in an active state or in a de-active state. During the search for a rule for a packet, the rule controller 104 may also check if the rule is in the active state before performing the follow up operation associated with the rule. The rule logic 102 may be configured not to select a rule that is in the de-active state. If a found rule is in the de-active state, in some examples, a default rule may be triggered instead of triggering the de-active rule.

When a rule is found for a packet, the countdown counter associated with the found rule may be reset such that it restarts the count. Hence, if same types of packets (e.g., packets containing the same source and destination addresses) continue to arrive at the input port, the network switch 100 continues to process the received packets according to the configured follow up operation for the rule instead of sending the packets to the external firewall for processing. However, when no packet of the same type is received before the configurable countdown counter runs to the end (e.g., the time out period), the rule may be marked as de-active. In some examples, the rule may be deleted from the CAM when time out occurs.

The system timer 108 may run continuously at configurable intervals to decrement the countdown counter and when the countdown counter reaches the final value (e.g., 0), the rule controller 104 may either delete the rule (or in some examples, the rule may be marked as de-active) whose countdown counter has run.

In some examples, a follow up operation may include a plurality of tasks to be performed. For example, a follow up operation may include de-activating or deleting the source address 10.10.1.1:1002 to the destination address 10.10.0.1:1001 forwarding rule and the source address 10.10.0.1:1001 to the destination address 10.10.1.1:1002 forwarding rule (reserve direction forwarding) when the source address 10.10.1.1:1002 to the destination address 10.10.0.1:1001 forwarding rule is de-activated. In this example, when a forwarding rule from a source to a destination is de-activated, the reverse forwarding rule may also be de-activated.

Figure 2:
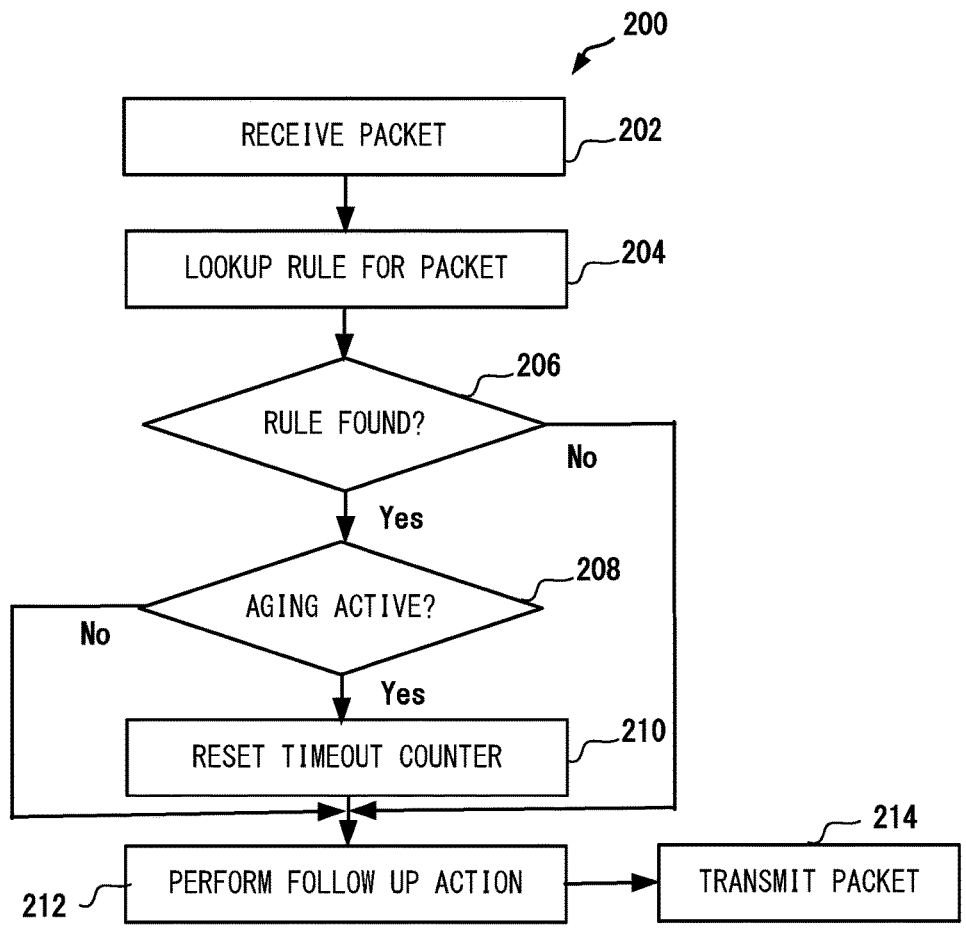
FIG. 2 depicts a method of applying rules to a packet in accordance with one or more embodiments of the present disclosure.

FIG. 2 shows a flow chart of a method 200 for processing a packet received at the network switch 100. Accordingly, at step 202, a packet is received at the input port. At step 204, the rule controller 104 performs a look up in the memory of the rule logic 102 to find a rule configured to process the packet based on the contents of the packet. For example, a rule may be configured to process a packet with a source address 10.10.1.1:1002 and a destination address 10.10.0.1: 1001. At decision step 206, if no rule is found for the packet based on the contents of the packet, at step 212, a default follow up operation may be performed. In one example, the default follow up operation may include a task to forward the packet to an external firewall. If the external firewall accepts the packet, the rule controller 104 may create a new rule so that the future packets of the same type received within a preconfigured period from the receive time of the first packet of that type can be processed without involving the external firewall. At step 214, the packet is processed (e.g., transmit packet, drop packet, close connection) according to the follow up operation.

At decision step 206, if a rule is found based on the content of the packet, at decision step 208, if the aging is active for the rule (e.g., the timeout has not expired), the counter for the rule is reset to start over. In some examples, the reset operation associated with the rule may be configurable. For example, if the timeout expiry is configured to be based on a number of received packets, the counter will not be reset to its initial value when the reset operation is called. In this example, the rule will be disabled after the preset number of packets are received. If the aging is not active (e.g., the rule is in the de-activate state or the countdown counter is 0 or has run), a default rule may be triggered. At step 212, a follow up operation of associated with the rule (or the default rule, if the timeout has occurred) is executed.

Figure 3:
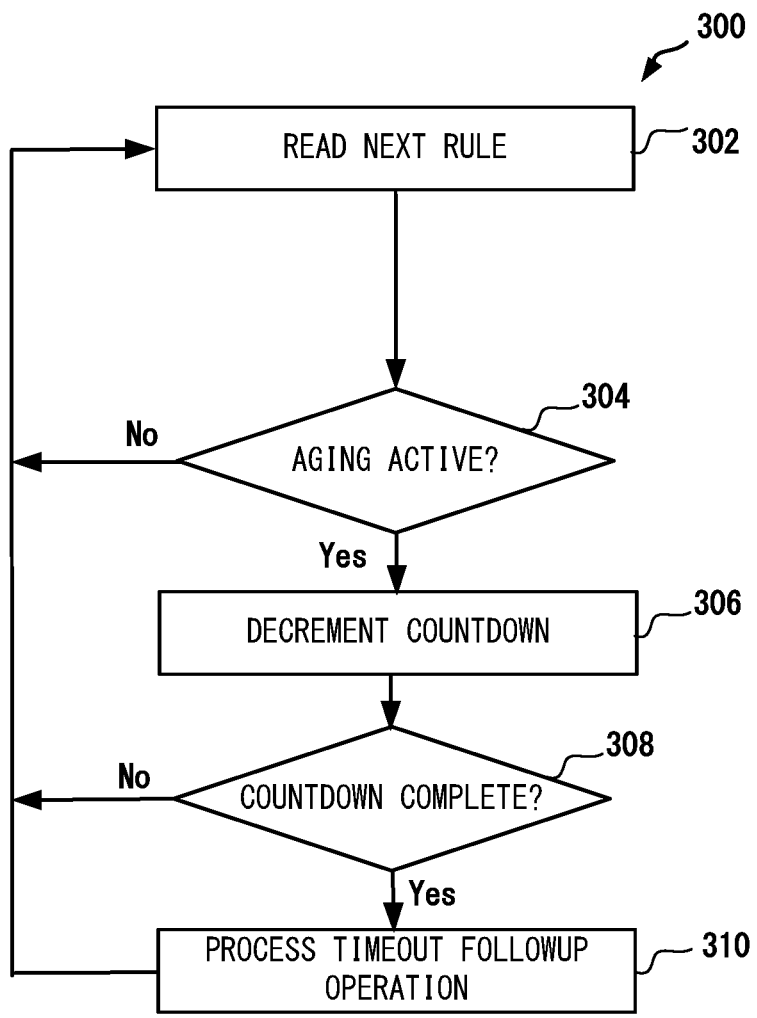
FIG. 3 shows a method of continuously managing packet processing rules in accordance with one or more embodiments of the present disclosure.

FIG. 3 shows a flow chart of a method 300 to manage the countdown counters associated with the rules stored in the rule logic 102. The method 300 may be executed at a configurable interval continuously. Accordingly, at step 302, the system timer 108 reads the first rule in the rule memory. At decision step 304, if the aging is active for the rule (e.g., the rule is in the active state), at step 306, the countdown counter associated with the rule is decremented. At decision step 308, if the countdown counter is complete (e.g., the timeout has occurred), at step 310 a configurable timeout follow up operation may be performed. The timeout follow up operation may be stored similar to the follow up operations discussed above. A timeout follow up operation may be setting a flag to indicate a de-active status for the rule. The step 210 is also executed when at step 304, no aging is active for the rule. At decision step 308, if the countdown is not complete, the control goes back to step 302.

A timeout follow up operation may include rule modifications, e.g., deactivation of rule, deleting the rule or change of forwarding vector. The timeout follow up operations may apply to more than one rules, e.g., deactivating the next rule in the lookup could be used to deactivate another rule that is configured to process packets from the opposing direction of the connection. The counting process may also be modified. In some examples, different rules may be configured to have different timeout periods. A timeout follow up operation may be used to alter the timeout period of a rule. A timeout follow up operation may also be used for raising alerts or notifying a network management system or raising an interrupt request to an external system.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A network switch, comprising:
   processing circuitry configured to process packets according to a set of packet processing rules;
   an input port coupled to the processing circuitry; and
   a memory coupled to the processing circuitry and configured to store a counter value;
   wherein the processing circuitry is configured to:
   receive an incoming packet via the input port; and to
   determine whether a packet processing rule corresponding to the incoming packet exists in the set of packet processing rules;
   wherein, when a packet processing rule corresponding to the incoming packet exists in the set of packet processing rules, the processing circuitry is configured to reset the counter value and process the incoming packet according to the packet processing rule corresponding to the incoming packet by performing a preconfigured follow-up action associated with the rule corresponding to the incoming packet;
   wherein, when no packet processing rule corresponding to the incoming packet exists in the set of packet processing rules, the processing circuitry is configured to process the incoming packet a default rule;
   wherein the processing circuitry is configured to determine whether a packet processing rule corresponding to the incoming packet exists in the set of packet processing rules based at least on a portion of the incoming packet that includes a header of the incoming packet or a payload of the incoming packet;
   wherein processing the incoming packet according to the default rule includes dropping the incoming packet or closing a connection from a source of the incoming packet; and
   wherein processing the incoming packet according to the packet processing rule corresponding to the incoming packet includes retrieving a flag value that indicates whether the packet processing rule corresponding to the incoming packet is active or inactive.

2. The network switch of claim 1, wherein the processing circuitry is configured to determine whether a packet processing rule corresponding to the incoming packet exists in the set of packet processing rules by providing the portion of the incoming packet to a content addressable memory that is configured to indicate whether the content-addressable memory stores information corresponding to the portion of the incoming packet.

3. The network switch of claim 1, wherein the processing circuitry is further configured to verify that the counter value has not reached a predefined value indicating that a rule expiry period has passed; and
   wherein the counter value represents a time value, a number of bytes received, or a number of packets received.

4. The network switch of claim 1, wherein processing the incoming packet according to the default rule includes forwarding the packet to an external firewall via an output port of the network switch that is coupled to the processing circuitry.

5. The network switch of claim 1, wherein the incoming packet includes a subpacket and the portion of the incoming packet includes data from the incoming packet and the subpacket.

6. The network switch of claim 1, wherein processing the incoming packet according to the default rule includes setting up a rule for processing future packets from a same source as a source of the incoming packet.

7. The network switch of claim 1, wherein the processing circuitry is configured to use a system timer to alter the counter value in configurable intervals.

8. The network switch of claim 7, wherein the processing circuitry is configured to set the flag value to indicate that the rule corresponding to the incoming packet is inactive once the counter reaches a preconfigured threshold value.

9. A method of automatically routing packets by a network switch, the method comprising:
   receiving an incoming packet at an input port of the network switch by processing circuitry of the network switch;
   determining, by the processing circuitry whether a packet processing rule corresponding to the incoming packet exists in a set of packet processing rules accessible to the processing circuitry of the network switch;

wherein, when a packet processing rule corresponding to the incoming packet does exist in the set of packet processing rules, the method further comprises:

the processing circuitry resetting a counter value associated with the packet processing rule corresponding to the incoming packet; and the processing circuitry processing the incoming packet to a by performing a preconfigured follow-up action associated with the packet processing rule corresponding to the incoming packet;

wherein, when no packet processing rule corresponding to the incoming packet exists in the set of packet processing rules, the method further comprises the processing circuitry processing the packet according to a default packet processing rule;

wherein the method further comprises the processing circuitry determining whether a packet processing rule corresponding to the incoming packet exists based at least on a portion of the incoming packet that includes a header or a payload of the incoming packet;

wherein processing the incoming packet according to the default rule includes closing connection; and wherein processing the incoming packet according to the rule corresponding to the incoming packet includes determining whether a flag value corresponding to that rule indicates that said rule is active or inactive.

10. The method of claim 9, wherein processing the incoming packet according to the rule corresponding to that packet includes determining that the counter value has not reached a value indicating that a predefined rule expiry period has elapsed.

11. The method of claim 9, wherein processing the incoming packet according to the default rule includes forwarding the packet to an external firewall via an output port of the network switch that is coupled to the processing circuitry.

12. The method of claim 9, wherein processing the incoming packet according to the default rule includes dropping the incoming packet or closing a connection from a source of the incoming packet.

13. The method of claim 9, wherein processing the incoming packet according to the default rule includes setting up a rule for routing future packets from a same source as a source of the incoming packet.

14. The method of claim 9, wherein the method further comprises the processing circuitry determining that the flag value indicates that the packet processing rule corresponding to the incoming packet is active.

15. The method of claim 9, wherein the portion of the incoming packet includes a predefined data pattern in the header or the payload of the incoming packet.

16. A network switch comprising:

processing circuitry configured to process packets according to a set of packet processing rules;

an input port coupled to the processing circuitry; and a memory coupled to the processing circuitry and configured to store a counter value;

wherein the processing circuitry is configured to:

receive an incoming packet via the input port; and determine whether a packet processing rule corresponding to the incoming packet exists in the set of packet processing rules;

wherein, when a packet processing rule corresponding to the incoming packet exists in the set of packet processing rules, the processing circuitry is configured to reset the counter value and process the incoming packet according to a preconfigured follow-up action associated with the rule corresponding to the incoming packet;

wherein, when no packet processing rule corresponding to the incoming packet exists in the set of packet processing rules, the processing circuitry is configured to process the incoming packet according to a default rule;

wherein the processing circuitry is configured to determine whether a packet processing rule corresponding to the incoming packet exists in the set of packet processing rules based at least on a portion of the incoming packet that includes a header of the incoming packet or a payload of the incoming packet; and wherein processing the incoming packet in accordance with the packet processing rule corresponding to the incoming packet includes retrieving a flag value that indicates whether the rule corresponding to the incoming packet is active or inactive.

* * * * *